United States Patent
Bellotti et al.

(10) Patent No.: US 10,471,633 B2
(45) Date of Patent: Nov. 12, 2019

(54) PHOTOCURABLE COMPOSITIONS

(71) Applicant: LAMBERTI SPA, Albizzate (IT)

(72) Inventors: Elena Bellotti, Marnate (IT); Emilio Cremona, Venegono Superiore (IT); Silvia Mansi, Varese (IT); Giovanni Floridi, Novara (IT); Giuseppe Li Bassi, Gavirate (IT)

(73) Assignee: Lamerti SPA, Albizzate, (VA) (IT)

( * ) Notice: Subject to any disclaimer, the term of this patent is extended or adjusted under 35 U.S.C. 154(b) by 0 days.

(21) Appl. No.: 15/524,557

(22) PCT Filed: Nov. 3, 2015

(86) PCT No.: PCT/EP2015/075514
§ 371 (c)(1),
(2) Date: May 4, 2017

(87) PCT Pub. No.: WO2016/071304
PCT Pub. Date: May 12, 2016

(65) Prior Publication Data
US 2017/0334098 A1 Nov. 23, 2017

(30) Foreign Application Priority Data
Nov. 4, 2014 (IT) .............................. VA2014A0031

(51) Int. Cl.
| | |
|---|---|
| B29C 35/08 | (2006.01) |
| B28B 7/00 | (2006.01) |
| B29C 33/38 | (2006.01) |
| B28B 7/34 | (2006.01) |
| B28B 7/36 | (2006.01) |
| B29C 33/42 | (2006.01) |
| B29C 33/56 | (2006.01) |
| C08F 2/48 | (2006.01) |
| C09D 11/101 | (2014.01) |
| B29C 39/00 | (2006.01) |
| B29C 39/02 | (2006.01) |
| B33Y 70/00 | (2015.01) |
| B33Y 10/00 | (2015.01) |
| E04F 13/14 | (2006.01) |
| B29C 64/135 | (2017.01) |
| B29K 105/00 | (2006.01) |
| B29K 105/24 | (2006.01) |
| B29L 31/10 | (2006.01) |
| B29L 31/00 | (2006.01) |

(52) U.S. Cl.
CPC ........ *B29C 35/0805* (2013.01); *B28B 7/0064* (2013.01); *B28B 7/346* (2013.01); *B28B 7/364* (2013.01); *B29C 33/3842* (2013.01); *B29C 33/424* (2013.01); *B29C 33/56* (2013.01); *B29C 39/003* (2013.01); *B29C 39/02* (2013.01); *C08F 2/48* (2013.01); *C09D 11/101* (2013.01); *B29C 64/135* (2017.08); *B29C 2035/0827* (2013.01); *B29C 2035/0833* (2013.01); *B29K 2105/0014* (2013.01); *B29K 2105/24* (2013.01); *B29L 2031/104* (2013.01); *B29L 2031/732* (2013.01); *B33Y 10/00* (2014.12); *B33Y 70/00* (2014.12); *E04F 13/142* (2013.01)

(58) Field of Classification Search
CPC ... B29C 35/0805; B29C 39/003; B29C 39/04; B29C 33/424; B29C 2035/0827; B29C 2035/0833; B29K 2105/0014; B29K 2105/24; B29L 2031/104; B29L 2031/732
USPC .......................................................... 264/496
See application file for complete search history.

(56) References Cited

U.S. PATENT DOCUMENTS

| | | |
|---|---|---|
| 3,844,916 A | 10/1974 | Gaske |
| 5,482,649 A | 1/1996 | Meixner et al. |
| 5,734,002 A | 3/1998 | Reich et al. |
| 5,976,735 A * | 11/1999 | Monk .................... G03F 7/029 430/18 |
| 2010/0163708 A1 | 7/2010 | Louh et al. |

FOREIGN PATENT DOCUMENTS

| | | | |
|---|---|---|---|
| CN | 202344654 U | * | 7/2012 |
| EP | 0280222 A2 | | 2/1988 |
| WO | 2003089991 A2 | | 10/2003 |
| WO | 2012062692 A1 | | 5/2012 |

OTHER PUBLICATIONS

Translation of CN 202344654, Jul. 25, 2012. (Year: 2012).*

* cited by examiner

*Primary Examiner* — Hui H Chin
(74) *Attorney, Agent, or Firm* — Vorys, Sater, Seymour and Pease LLP; Elisabeth Rather Healey

(57) ABSTRACT

The present invention relates to a method for the preparation of dies for moulds for the production of tiles with three dimensional texture.

18 Claims, No Drawings

PHOTOCURABLE COMPOSITIONS

TECHNICAL FIELD

The present invention relates to a method for the preparation of dies for moulds for the production of tiles with three dimensional texture.

PRIOR ART

The world of ceramic tile is wide and spectacular, with an always increasing number of product choices and style options.

One popular option in many construction projects is the use of various tiles with three-dimensional (3D) texture on the exposed surface to create a "bas-relief" look and feel. These special tiles, both for floor and wall decoration and other uses, are offered in a broad range of textures, with different patterns and sizes.

For example, ceramic and porcelain manufacturers have created tiles that offer textures and colors resembling natural look or themes, such as natural stones or wood. Others show complex and particular three dimensional geometric patterns.

The conventional procedure for producing ceramic tiles is to form a powdered charge of ground mineral substances with about 6/12 percent by weight of water. The mixture still in powdered form is pressed in a mold (forming) where it is united into a cohesive tile body which is strong enough to resist moderate handling. The "green" tile is then trimmed, dried and coated with a glaze material. After being placed on refractory setters, the tiles are sent through a kiln for final firing.

One method for obtaining 3D textures on tiles contemplates the forming with molds equipped with dies having a (negative) 3D textured surface. These dies are obtained, for example, by applying an elastomeric material with 3D textured surface on an appropriate substrate or by engraving a metal die with an acid (chemical etching) or by laser ablation.

The classic technique of applying an elastomeric material requires a very complex preparation procedure and does not allow the preparation of dies for forming of tiles with a continuous process.

Chemical etching of metal surfaces is also practiced, but it does not allow a high precision of the deepness of the engravings and it requires the use of large amount of dangerous and environmentally problematic mineral acids.

Laser ablation is a slow technique and practically does not allow the preparation of dies for large sized tiles.

Finally for the impression of complicated and varied patterns with very fine details, which is becoming more and more common, the fabrication cost of these dies becomes practically prohibitive.

Now we have found that three dimensional textures can be obtained on dies for moulds for tile forming by properly applying onto a base-die and photocuring a specific photocurable composition, creating a film with a three dimensional pattern. With these specific compositions, dies with large variety of 3D textures, also with very complex and detailed patterns, can be easily prepared at low cost, especially when the composition is applied with digital apparatus. The films with three dimensional texture obtained with these compositions show high resistance to abrasion, high adhesion to the substrate, low stickiness towards the powder mixture and good performances of tile texturizing. Moreover the film can be easily removed from the 3D die and the base-die can be re-used.

DESCRIPTION OF THE INVENTION

It is therefore an object of the present invention a method for preparing tiles with 3D texture, comprising the step of forming said tiles with a mould equipped with a die prepared with a process comprising the following steps:
I) providing a photocurable composition containing:
 a) from 70 to 99% by weight (% wt), preferably from 75 to 95% wt, of at least one ethylenically unsaturated compound;
 b) from 1 to 12% wt, preferably from 3 to 10% wt, of at least one photoinitiator;
II) applying said photocurable composition onto the surface of a base-die to form a film with a three dimensional pattern;
III) photocuring said photocurable composition by exposing the surface of the base-die to light with wavelength from 200 to 600 nm;
with the proviso that the film, obtained by photocuring 200 $g/m^2$ of said photocurable composition on a steel plate, has an elastic hardness comprised between 50 and 300 sec, preferably between 80 and 250 sec, more preferably between 100 and 220 sec, determined according to the standard method ISO 1522:2006.

DETAILED DESCRIPTION OF THE INVENTION

The expert in the art can easily find, among the ethylenically unsaturated compounds used in the coating industry, the proper compound or mixtures thereof that can give films with the elastic hardness required for the realization of the present invention. Those used for the preparation of hard coatings are particularly preferred.

The ethylenically unsaturated compound may be selected among compounds having one or more unsaturated groups per molecule and such compounds may be used alone or in combination as a mixture. They can have low molecular weight (monomeric) or high molecular weight (oligomeric).

Preferably the component a) is a mixture of compounds which can have different number of ethylenically unsaturated groups.

In an embodiment of the present invention, the component a), based on the total weight of the component, consist of from 0 to 40% wt of ethylenically unsaturated compounds having one ethylenically unsaturated group, from 0 to 60% by weight of ethylenically unsaturated compounds having two ethylenically unsaturated groups, from 0 to 70% wt of ethylenically unsaturated compounds having three ethylenically unsaturated groups and from 0 to 70% wt of ethylenically unsaturated compounds having four or more ethylenically unsaturated groups.

It is preferred that the component a), based on its total weight, consists of from 0 to 20% wt of ethylenically unsaturated compounds having one ethylenically unsaturated group, from 0 to 55% by weight of ethylenically unsaturated compounds having two ethylenically unsaturated groups, from 0 to 60% wt of ethylenically unsaturated compounds having three ethylenically unsaturated groups and from 0 to 60% wt of ethylenically unsaturated compounds having four or more ethylenically unsaturated groups.

It is more preferred that the compounds having two ethylenically unsaturated groups, the compounds having three ethylenically unsaturated groups and the compounds having four or more ethylenically unsaturated groups are contained in amounts of 10 to 50% wt, 10 to 60% wt and 0 to 60% wt, respectively, provided that they represent 100% wt of the component a).

The ethylenically unsaturated compound of a) is preferably chosen among (meth)acrylate compounds having one or more ethylenically unsaturated groups per molecule.

Within the expression (meth)acrylates compounds, we include both methacrylate compounds and acrylate compounds, chosen among (meth)acrylate compounds, urethane (meth)acrylate compounds, epoxy (meth)acrylates compounds, polyester (meth)acrylate compounds, polyether (meth)acrylate compounds, silicone (meth)acrylate compounds, (meth)acrylic (meth)acrylates compounds and mixtures thereof.

Specific examples of (meth)acrylate compounds with one ethylenically unsaturated group include 2-hydroxyethyl (meth)acrylate, 2-hydroxypropyl (meth)acrylate, isobutyl (meth)acrylate, t-butyl (meth)acrylate, 2-ethylhexyl (meth) acrylate, 2-ethylhexylcarbitol (meth)acrylate, butoxyethyl (meth)acrylate, diethoxyethyl (meth)acrylate, methoxytriethylene glycol (meth)acrylate, methoxypolyethylene glycol (meth)acrylate, stearyl (meth)acrylate, cyclohexyl (meth) (meth)acrylate, tetrahydrofurfuryl (meth) acrylate, isobornyl (meth)acrylate, dicyclopentenyl (meth)acrylate, dicyclopentanyl (meth)acrylate, dicyclobenzyl (meth)acrylate, N-methylol acrylamide, N-methoxymethyl acrylamide, N-ethoxymethyl acrylamide, N-n-butoxymethyl acrylamide, N-methyl acrylamide, N,N-dimethyl acrylamide, N,N-dimethylaminoethyl (meth)acrylate, N,N-dimethylaminopropyl acrylamide, acryloyl morpholine, diglycidyl (meth)acrylate, n-butyl (meth)acrylate, ethyl (meth)acrylate, and mixtures thereof.

Examples of (meth)acrylate compounds which have two ethylenically unsaturated groups include the following compounds: ethylene glycol di(meth)acrylate, diethylene glycol di(meth)acrylate, triethylene glycol di(meth)acrylate, propylene glycol di(meth)acrylate, dipropylene glycol di(meth) acrylate, tripropylene glycol di(meth)acrylate, 1,3-butanediol di(meth)acrylate, 1,4-butanediol di(meth)acrylate, 1,5-pentanediol di(meth)acrylate, isoprene glycol di(meth) acrylate, 1,6-hexanediol di(meth)acrylate, neopentyl glycol di(meth)acrylate, octanediol di(meth)acrylate, 1,2-cyclohexanediol di(meth)acrylate, 1,4-cyclohexanediol di(meth) acrylate, hydrogenated bisphenol-A di(meth)acrylate, glycerol di(meth)acrylate, trimethylol ethane di(meth)acrylate, trimethylol propane di(meth)acrylate, polyethylene glycol di(meth)acrylate with a average of recurring ethyleneoxy groups comprised between 4 and 25, polypropylene glycol di(meth)acrylate with a average of recurring propyleneoxy groups comprised between 4 and 25, ethoxylated bisphenol-A di(meth)acrylate and propoxylated bisphenol-A di(meth)acrylate, and mixtures thereof.

Examples of (meth)acrylate compounds with three ethylenically unsaturated groups are glycerol tri(meth)acrylate, ethoxylated or propoxylated glycerol tri(meth)acrylate, trimethylol ethane tri(meth)acrylate, trimethylol propane tri(meth)acrylate, ethoxylated or propoxylated trimethylol propane tri(meth)acrylate, diglycerol tri(meth)acrylate, erythritol tri(meth)acrylate, pentaerythritol tri(meth)acrylate, ditrimethylol propane tri(meth)acrylate and tris[(meth) acryloxyethyl] isocyanurate, and mixtures thereof.

Examples of (meth)acrylate compounds with more than three ethylenically unsaturated groups are erythritol tetra (meth)acrylate, pentaerythritol tetra(meth)acrylate, diglycerol tetra(meth)acrylate, and ditrimethylol propane tetra (meth)acrylate; (meth)acrylate compounds of pentavalent alcohols, such as triglycerol tetra(meth)acrylate and triglycerol penta(meth)acrylate; and (meth)acrylate compounds of hexavalent alcohols, such as dipentaerythritol penta(meth) acrylate and dipentaerythritol hexa(meth)acrylate, and mixtures thereof.

Examples of urethane (meth)acrylate compounds with two or more ethylenically unsaturated groups include urethane (meth)acrylates which are reaction mixtures obtained by reacting 2-hydroxyethyl(meth)acrylate which may have an alkylene oxide chain with hexamethylene diisocyanate, isophorone diisocyanate, 2,2,4-trimethylhexamethylene diisocyanate, dicyclohexylmethane diisocyanate, norbornene diisocyanate or methylcyclohexane diisocyanate or with an urethane prepolymer prepared by reacting the above mentioned isocyanate with a low-molecular weight polyfunctional polyol such as a polyalkylene glycol having a recurring unit such as ethylene oxide or propylene oxide or hexamethylene oxide, a polyester diol, a polycarbonate diol and a polybutadiene diol, or a low molecular-weight polyol such as ethylene glycol, propylene glycol, 1,3-propanediol, 1,4-butanediol, 1,5-pentanediol, 1,6-hexanediol, neopentyl glycol, diethylene glycol, dipropylene glycol, 1,4-cyclohexane diol, 1,4-cyclohexane dimethanol, glycerin, trimethylolpropane or pentaerythritol.

Also hyperbranched (meth)acrylate resins, which usually are urethane or polyester (meth)acrylates and can have up to 18 unsaturated groups, can be used.

(Meth)acrylates containing acid groups, usually carboxylic groups (such as acrylic acid, e.g., CD9051, CD9051 from Sartomer Europe; Ebecryl 168 and Ebecryl 170 from Allnex Industries Inc.), tertiary amines that contains electron donating substituents on the nitrogen (e.g., Ebecryl P104, Ebecryl P105, Ebecryl 7100 from Allnex Industries Inc.) are also suitable for the realization of the present invention.

Silicone acrylate compounds, which provide smooth films with tack-free surface, are also suitable for the realization of the present invention.

Example of these ethylenically unsaturated compounds are Ebecryl 350 and Ebecryl 1360 from Allnex.

Examples of photoinitiators, which can be used as component b), include acylphosphine oxides, both monoacylphosphine oxides and bisacylphosphine oxides, 3-acyl coumarin derivatives, aromatic onium salt compounds, organic peroxides, thioxanthones, hexaaryl bisimidazoles, O-acyloxime esters, borate compounds, azinium compounds, metallocene compounds, benzophenones, α-diketones, ketosulfones, α-aminoketones, benzoin and benzoin ethers, benzil ketals, α-hydroxyketones, bi-functional photoinitiators and mixture thereof. Examples of thioxanthones are thioxanthone, diethyl thioxanthone, 2-isopropyl thioxanthone, 2-chloro thioxanthone, 2,4-diethyl thioxanthone, 2-dodecyl thioxanthone, 2,4-dimethyl thioxanthone, 1-methoxycarbonyl thioxanthone, 2-ethoxycarbonyl thioxanthone, 3-(2-methoxyethoxycarbonyl) thioxanthone, 4-butoxycarbonyl thioxanthone, 3-butoxycarbonyl-7-methyl thioxanthone or those described in the patent application WO/2012/062692, such as n-dodecyl-7-methyl-thioxanthone-3-carboxylate, N,N-disobutyl-7-methyl-thioxanthone-3-carbamide and mixtures thereof.

Examples of α-hydroxyketones and α-aminoketones are 1-hydroxy cyclohexylphenyl ketone, 2-hydroxy-2-methyl-1-phenyl-propane-1-one, 1-[4-(2-hydroxyethoxy)phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 2-hydroxy-1[4-(4-(2-hydroxy-2- methylpropionyl) phenoxy)phenyl]-2-methylpropan-1-one, 2-methyl-1-(4-methylthiophenyl)-2-morpholinopropane-1-one), 2-benzyl-2-dimethylamino-1-(4-morpholinophenyl)-butan-1-one, (2-(dimethylamino)-2-[(4-methylphenyl) methyl]-1-[4-(4-morpholinyl) phenyl]-1-butanone) and mixtures thereof.

An example of suitable ketosulfone is 1-[4-[(4-benzoyl-phenyl)-thio]-phenyl]-2-methyl-2-[(4-methyl-phenyl)-sulfonyl]-propan-1-one.

Examples of O-acyloxime ester photoinitiators are 1,2-octanedione, 1-[4-(phenylthio)phenyl]-, 2-(O-benzoyloxime), ethanone, 1-[9-ethyl-6-(2-methylbenzoyl)-9H-carbazole-3-yl], 1-(O-acetyloxime) and mixtures thereof.

Examples of the acylphosphine oxides photoinitiators include, but are not limited to, bis(2,4,6-trimethylbenzoyl) phenylphosphine oxide, 2,4,6-trimethylbenzoyl-diphenyl phosphine oxide and bis(2,6-dimethoxybenzoyl)-2,4,4-trimethylpentyl phosphine oxide.

Examples of benzophenones are benzophenone, 4-phenyl benzophenone, 4-methoxy benzophenone, 4-chloro benzophenone, 4,4'-dimethoxy benzophenone, 4,4'-dimethyl benzophenone, 4,4'-dichloro benzophenone, 4,4'-dimethylamino benzophenone, 4,4'-diethylamino benzophenone, 4-methyl benzophenone, 4,4'-diamino benzophenone, 2,4,6-trimethyl benzophenone, 4-(4-methylthiophenyl) benzophenone and mixtures thereof.

Examples of 3-acyl coumarin derivatives are 3-benzoyl coumarin, 3-benzoyl-7-methoxy coumarin, 3-benzoyl-5,7-di(propoxy) coumarin, 3-benzoyl-6,8-dichloro coumarin, 3-benzoyl-6-chloro coumarin, and mixtures thereof.

Other specific examples of photoinitiators include acetophenone, acetophenone benzil ketal, 2,2-dimethoxy-2-phenylacetophenone, xanthone, fluorenone, anthraquinone, 3-methylacetophenone, Michler's ketone, benzoin propyl ether, benzoin ethyl ether, benzil dimethyl ketal and mixtures thereof.

Preferred photoinitiators are acylphosphine oxides, α-hydroxyketones, α-aminoketones, ketosulfones, benzophenones, bi-functional photoinitiators and mixture thereof, for example Esacure 1001M, Esacure ONE, Esacure KIP 160 and Esacure TZT, commercialized by Lamberti S.p.A., IT.

The photocurable composition of the invention can also comprise, as further additive, from 0.05 to 12% by weight, preferably from 0.1 to 10% by weight of at least a photosensitizer.

In the present text, with photosensitizer we mean a compound that, through a process of energy transfer, activates the photoinitiator at wavelength where the photoinitiator alone would not be reactive. Some of these compounds can be also used alone as photoinitiators.

Examples of photosensitizers are those commonly used in the art: aromatic carbonyl compounds, e.g. thioxanthones, anthraquinones, coumarins and 3-acyl coumarin derivatives, terphenyls, styryl ketones, and camphorquinones, and also eosin, rhodamine and erythrosine dyes. Examples of coumarin derivatives may include 4-methyl-7-dimethylamino coumarin, 4-methyl-7-ethylamino coumarin, 4-methylpiperidino[3.2-g]coumarin, 4-methyl-7-cyclohexyl amino coumarin, 4-trifluoromethyl-7-diethylamino coumarin, 3-phenyl-4-methyl-7-diethylamino coumarin, 3-(2'-N-methyl benzimidazoyl)-7-diethylamino coumarin, 4-trifluoromethyl-6-methyl-7-ethylamino coumarin, 3-phenyl-7-amino coumarin and mixtures thereof.

Examples of 3-acyl coumarin derivatives and thioxanthones, suitable as photosensitizers, are those mentioned above.

The photocurable composition of the invention can also conveniently include a co-initiator, which is a molecule that acts as hydrogen donor that increases the polymerization rate. The co-initiators are known in the art and they are typically alcohols, thiols, amines or ethers that have an available hydrogen, bonded to a carbon adjacent to the heteroatom. Such co-initiators are generally present in an amount comprised between 0.2 and 12% by weight, preferably from 0.2 to 8%, by weight based on the total photocurable composition weight. Suitable co-initiators include, but are not limited to, aliphatic, cycloaliphatic, aromatic, aryl-aliphatic, heterocyclic, oligomeric or polymeric amines. They can be primary, secondary or tertiary amines, for example butyl amine, dibutyl amine, tributyl amine, ciclohexyl amine, benzyldimethyl amine, di-cyclohexyl amine, N-phenyl glycine, triethyl amine, phenyl-diethanol amine, triethanol amine, piperidine, piperazine, morpholine, pyridine, quinoline, esters of dimethylamino benzoic acid, Michler's ketone (4,4'-bis-dimethyl amino benzophenone) and corresponding derivatives.

As the amine co-initiator, an amine-modified acrylate compound can be used, examples of such amine-modified acrylate include acrylates modified by reaction with a primary or secondary amine that are described in U.S. Pat. No. 3,844,916, EP 280222, U.S. Pat. Nos. 5,482,649 or 5,734,002. Preferred co-initiators are Esacure A198 (bis-N,N-[4-dimethylaminobenzoyl) oxyethylen-1-yl]-methylamine) and Esacure EDB (ethyl-4-dimethylamino benzoate), both commercialized by Lamberti S.p.A., 2-ethylhexyl-4-dimethylaminobenzoate and N-phenyl glycine.

Besides the above-mentioned compounds, other components normally used in the field and known to the experts in the art can be added to the photocurable compositions of the invention. For example, thermal stabilizers, photo-oxidation stabilizers, anti-oxidants, solvents, dispersants, adhesion promoters, and other additives of general use. Others components of the photocurable compositions of the invention can be powder-like inorganic filler which allow to increase the hardness of the 3D film. Such components, for example alumina, silica, or titanium oxide, are well known in the hard-coating sector.

The photocurable composition of the invention can be prepared by simply mixing the various components described above at room temperature or under light heating if solid compounds, which need to be dissolved, are present.

The photocurable composition of the invention has a Brookfield® RVT viscosity, measured at 50 rpm and 40° C., comprised between 20 and 2000 mPa·s, preferably between 30 and 500 mPa·s, more preferably between 40 and 200 mPa·s.

The photocurable composition of the invention can be applied on any kind of base-die. It can have any shape and dimensions suitable for the insertion in moulds and can be made with any material commonly used for forming tiles, such as a metal, for example steel, or a composite material with fiberglass, carbon fibers and Kevlar. Preferably the base-die material is a metal, more preferably is steel.

The photocurable composition of the invention can be applied on the base-die using techniques which allows to obtain a three dimensional textures on the die surface, such as lithography, spraying, ink-jet printing and stereo-litography. The application of the photocurable composition can be performed in different steps, each followed by the photocuring of the applied composition. Preferably, the photocurable composition of the invention is applied by ink-jet printing.

Before the application, the base-die can be subjected to some treatment for example it can be sanded or a layer of primer can applied on its surface. These pre-treatments can increase the adhesion and the performances of the 3D film.

The photocuring process according to the invention is performed by exposing the surface of the base-die with the photocurable composition to light with wavelength from 200 nm to 600 nm. Accordingly a large number of the most varied kinds of light sources may be used. Both point sources and planiform radiators (lamp belts) are suitable. Examples are: carbon arc lamps, xenon arc lamps, medium pressure, high pressure and low pressure mercury arc radiators, doped, where appropriate, with metal halides (metal halide lamps), microwave-excited metal vapour lamps, excimer lamps, superactinic fluorescent tubes, fluorescent lamps, argon incandescent lamps, flash lamps, photographic floodlight lamps, light-emitting diodes (LED), electron beams, X-rays and lasers. The radiation energy of the active energy rays can be chosen as appropriate depending on the thickness of the layer of the photocurable composition and/or the type and amount of usage of the photoinitiators. Preferably the light sources are mercury arc radiators of any kind and LED lamps.

The compositions of the invention can be used to prepare dies for moulds to be used in any kind of forming process for the production of tiles with 3D texture, such as discontinuous and continuous processes, dry or semi-dry processes, etc. The photocurable compositions, here disclosed, are particularly suitable for the preparation of dies for moulds for continuous forming processes.

Examples of preparation of photocurable compositions according to the invention, only for illustrative purpose and not limitative, are reported in the following paragraphs.

EXAMPLES

Examples 1-8

The ethylenically unsaturated compounds (monomers or oligomers), the photoinitiators and the co-initiators used for the preparation of photocurable compositions are described in Table 1.

TABLE 1

| Ingredient | Chemical Nature | From | Function |
|---|---|---|---|
| Ebecryl 8602 | Aliphatic Urethane Nonaacrylate | Allnex Ind. Inc. | Oligomer |
| Ebecryl 8415 | Aliphatic Urethane Decaacrylate | Allnex Ind. Inc. | Oligomer |
| Ebecryl 1290 | Aliphatic Urethane Hexaacrylate | Allnex Ind. Inc. | Oligomer |
| Ebecryl 770 | Carboxylated Polyester Methacrylate-Hydroxyethyl Methacrylate | Allnex Ind. Inc. | Oligomer |
| Ebecryl 600 | Bisphenol A Epoxy Diacrylate | Allnex Ind. Inc. | Oligomer |
| Ebecryl 525 | Polyester Resin-Tripropyleneglycol Diacrylate | Allnex Ind. Inc. | Oligomer |
| Ebecryl 350 | Silicone Diacrylate | Allnex Ind. Inc. | Monomer |
| Ebecryl 168 | Acidic Methacrylated Compound | Allnex Ind. Inc. | Monomer |
| Ebecryl 160 | Ethoxylated Trimethylol Propane Triacrylate | Allnex Ind. Inc. | Monomer |
| Ebecryl 40 | Polyether tetraacrylate | Allnex Ind. Inc. | Monomer |
| PETIA | Pentaerythritol Tri- and Tetra-acrylate | Allnex Ind. Inc | Monomer |
| TMPTA | Trimethylol Propane Triacrylate | Allnex Ind. Inc. | Monomer |
| TPGDA | Tripropyleneglycol Diacrylate | Allnex Ind. Inc. | Monomer |
| OTA 480 | Propoxylated Glycerol Triacrylate | Allnex Ind. Inc. | Monomer |
| HDDA | Hexanediol Diacrylate | Allnex Ind. Inc. | Monomer |
| SR 205 | Triethylene Glycol Dimethacrylate | Sartomer Europe | Oligomer |
| SR 210 | Polyethylene Glycol 200 Dimethacrylate | Sartomer Europe | Oligomer |
| SR 350 | Trimethylolpropane Trimethacrylate | Sartomer Europe | Monomer |
| CN 159 | Bisphenol A Epoxy Methacrylate | Sartomer Europe | Oligomer |
| IBOA | Isobornyl Acrylate | Allnex Ind. Inc. | Monomer |
| Esacure ONE | alpha hydroxy ketone | Lamberti S.p.A. | Photoinitiator |
| Esacure KIP 160 | alpha hydroxy ketone | Lamberti S.p.A. | Photoinitiator |
| Esacure TZT | Benzophenone | Lamberti S.p.A. | Photoinitiator |
| Esacure ITX | Isopropyl Thioxanthone | Lamberti S.p.A. | Photoinitiator |
| Esacure EDB | Etyl-4-Dimethyl amino benzoate | Lamberti S.p.A. | Co-initiator |
| LR 8956 | Acrylated Amine | BASF | Co-initiator |

The photocurable compositions of Examples 1-8 were prepared dissolving the photoinitiators and the co-initiators in mixtures of ethylenically unsaturated compounds. The amount in % by weight of each ingredient are reported in Table 2.

200 $g/m^2$ of each photocurable composition were applied on steel plate using an electrical bar coater. The films were cured under air using a Fusion UV system apparatus equipped with a medium pressure mercury lamp at a speed of 10 m/min. The lamp power was set at 160 W/cm.

TABLE 2

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Ebecryl 8602 | 25.0 | 12.0 | 20.0 | 35.0 | | 9.0 | | |
| Ebecryl 8415 | | | | | | | 20.0 | |
| Ebecryl 600 | | | | | | 9.0 | 20.0 | |
| Ebecryl 350 | | | 5.0 | 5.0 | | 1.5 | 2.5 | 5 |
| Ebecryl 168 | 3.0 | 1.5 | 5.0 | 5.0 | 5.0 | 3.5 | 2.5 | 5 |
| Ebecryl 40 | | | | | | | 10.0 | |
| Ebecryl 525 | 15.0 | 7.5 | | | | | 19.0 | |
| Ebecryl 1290 | 25.0 | 11.0 | | | | | | |
| Ebecryl 770 | | | 20.0 | 35.0 | | | | |

TABLE 2-continued

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Ebecryl 160 | | | | | 11.0 | | | |
| PETIA | | | 22.0 | | 12.0 | 12.0 | | 27 |
| TMPTA | | | 22.0 | | 16.0 | 12.0 | 10.0 | 27 |
| TPGDA | 16.0 | 6.0 | | | | 6.0 | | |
| GPTA | | | | | 19.0 | 5.0 | | |
| HDDA | 10.0 | 6.0 | | 14.0 | | | | |
| SR 205 | | | | | 10.0 | 15.0 | | |
| SR 210 | | | | | 15.0 | 16.0 | | |
| SR 350 | | 25.0 | | | | | | |
| CN 159 | | 25.0 | | | | | | 30 |
| IBOA | | | | | | | 10.0 | |
| Esacure ONE | 3.0 | | 3.0 | | | 5.0 | 6.0 | |
| Esacure KIP 160 | | 6.0 | | 3.0 | 2.0 | | | |
| Esacure TZT | | | 3.0 | 1.0 | 2.0 | | | 1.0 |
| Esacure ITX | 1.0 | | | 1.0 | 3.0 | 3.0 | | 2.0 |
| Esacure EDB | 2.0 | | | | 5.0 | | | |
| LR 8956 | | | | | 1.0 | | 3.0 | 3.0 |
| Brookfield RVT Viscosity | 90 | 70 | 75 | 150 | 50 | 100 | 130 | 60 |
| Elastic Hardness | 120 | 70 | 100 | 110 | 105 | 150 | 130 | 80 |

Table 2 also reports the Brookfield® RVT viscosity (mPa·s) of the compositions of Example 1-8, determined at 40° C. and 50 rpm, and the elastic hardness (sec), determined according to the standard method ISO 1522:2006 (König pendulum).

3D Die Preparation

The suitability of the photocurable compositions of the invention for the preparation of die with 3D texture was evaluated using the compositions of Examples 1-8. The compositions were applied on a steel plate with a digital printing machine (Chromojet LM15-HSV400), modified with a 200 W/cm Hg lamp joined to the printer head. This allow the immediate curing of the applied compositions.

The software was set for a multilayer application with a pattern resembling the natural stone. Each layer had a thickness of 20 micron and, at the end of the application, the thickest area of the films with 3D texture were about 600 micron deep.

The final films showed very good adhesion to the substrate and fine definition without smears, good hardness and low stickiness. These characteristics makes them especially suitable for the forming of tiles.

The invention claimed is:

1. A method for preparing tiles with a 3D texture, comprising:
forming the tiles employing a mould equipped with a die prepared by a process
comprising the steps of:
I) providing a photocurable composition containing:
   a) from 70 to 99% by weight (% wt) of at least one ethylenically unsaturated compound; and
   b) from 1 to 12% wt of at least one photoinitiator;
II) applying the photocurable composition onto the surface of a base-die to form a film with a three dimensional pattern; and
III) photocuring the photocurable composition by exposing the surface of the base-die to light having a wavelength of from 200 to 600 nm to provide the 3D texture on the die for tile forming;
with the proviso that the film, obtained by photocuring 200 g/m² of the photocurable composition on a steel plate, has an elastic hardness of from about 50 to about 300 sec determined according to the standard method ISO 1522:2006.

2. The method of claim 1, wherein the photocurable composition produces a film having an elastic hardness of from about 80 to about 250 sec.

3. The method of claim 1, wherein the photocurable compositions comprises:
from 75 to 95% wt of at least one ethylenically unsaturated compound; and
from 3 to 10% wt of at least one photoinitiator.

4. The method of claim 1, wherein the 70 to 99% by weight (% wt) of at least one ethylenically unsaturated compound, based on the total weight of the component, consist of:
from 0 to 40% wt of ethylenically unsaturated compounds having one ethylenically unsaturated group,
from 0 to 60% by weight of ethylenically unsaturated compounds having two ethylenically unsaturated groups,
from 0 to 70% wt of ethylenically unsaturated compounds having three ethylenically unsaturated groups, and
from 0 to 70% wt of ethylenically unsaturated compounds having four or more ethylenically unsaturated groups;
and a sum of percentages of the ethylenically unsaturated compounds having one, two, three or four or more ethylenically unsaturated group or groups is 100%.

5. The method of claim 4, wherein the 70 to 99% by weight (% wt) of at least one ethylenically unsaturated compound, based on its total weight, consists of:
from 0 to 20% wt of ethylenically unsaturated compounds having one ethylenically unsaturated group,
from 0 to 55% by weight of ethylenically unsaturated compounds having two ethylenically unsaturated groups,
from 0 to 60% wt of ethylenically unsaturated compounds having three ethylenically unsaturated groups, and
from 0 to 60% wt of ethylenically unsaturated compounds having four or more ethylenically unsaturated groups;
and a sum of percentages of the ethylenically unsaturated compounds having one, two, three or four or more ethylenically unsaturated group or groups is 100%.

6. The method of claim 5, wherein the 70 to 99% by weight (% wt) of at least one ethylenically unsaturated compound, based on its total weight, consists of:
from 10 to 50 by weight of ethylenically unsaturated compounds having two ethylenically unsaturated groups,
from 10 to 60% wt of ethylenically unsaturated compounds having three ethylenically unsaturated groups, and
from 0 to 60% wt of ethylenically unsaturated compounds having four or more ethylenically unsaturated groups.

7. The method of claim 1, wherein the at least one ethylenically unsaturated compound is chosen from the group consisting of (meth)acrylates compounds having one or more ethylenically unsaturated groups per molecule, and combinations thereof.

8. The method of claim 1, wherein the at least one photoinitiator is chosen from the group consisting of: acylphosphine oxides, 3-acyl coumarin derivatives, aromatic onium salt compounds, organic peroxides, thioxanthones, hexaaryl bisimidazoles, O-acyloxime esters, borate compounds, azinium compounds, metallocene compounds, benzophenones, α-diketones, ketosulfones, α-aminoketones, benzoin and benzoin ethers, benzil ketals, α-hydroxyketones, bi-functional photoinitiators, and mixtures thereof.

9. The method of claim 8, wherein the at least one photoinitiator is chosen from the group consisting of: acylphosphine oxides, α-hydroxyketones, α-aminoketones, ketosulfones, benzophenones, bi-functional photoinitiators, and mixtures thereof.

10. The method of claim 1, wherein the photocurable composition further comprises from about 0.2 to about 12% by weight of at least one co-initiator.

11. The method of claim 10 wherein the co-initiator is an alcohol, thiol, amine or ether.

12. The method of claim 11 wherein the co-initiator is an amine selected from the group consisting of aliphatic, cycloaliphatic, aromatic, aryl-aliphatic, heterocyclic, oligomeric, and polymeric amines.

13. The method of claim 12 wherein the co-initiator is selected from the group consisting of (bis-N,N-[4-dimethylaminobenzoyl) oxyethylen-1-yl]-methylamine); ethyl-4-dimethylamino benzoate; N-phenyl glycine and combinations thereof.

14. The method of claim 1 wherein the photocurable composition further comprises a member selected from the group consisting of thermal stabilizers, photo-oxidation stabilizers, anti-oxidants, solvents, dispersants, adhesion promoters, and combinations thereof.

15. A tile prepared by the method of claim 1.

16. The tile of claim 15 wherein the tile is prepared employing a continuous production process.

17. The tile of claim 15 wherein the tile is prepared employing a discontinuous production process.

18. The method of claim 1 wherein the tiles are formed continuously.

* * * * *